United States Patent
Selim

(10) Patent No.: US 10,166,949 B1
(45) Date of Patent: Jan. 1, 2019

(54) VEHICLE SAFETY AND SECURITY SYSTEM

(71) Applicant: Adel Selim, Palm Beach Gardens, FL (US)

(72) Inventor: Adel Selim, Palm Beach Gardens, FL (US)

( * ) Notice: Subject to any disclaimer, the term of this patent is extended or adjusted under 35 U.S.C. 154(b) by 0 days.

(21) Appl. No.: 15/584,161

(22) Filed: May 2, 2017

(51) Int. Cl.
*B60R 25/102* (2013.01)
*B60R 25/30* (2013.01)
*B60R 25/31* (2013.01)
*B60R 25/33* (2013.01)

(52) U.S. Cl.
CPC .......... *B60R 25/102* (2013.01); *B60R 25/302* (2013.01); *B60R 25/305* (2013.01); *B60R 25/31* (2013.01); *B60R 25/33* (2013.01); *B60R 2325/205* (2013.01)

(58) Field of Classification Search
CPC combination set(s) only.
See application file for complete search history.

(56) References Cited

U.S. PATENT DOCUMENTS

| | | | |
|---|---|---|---|
| 6,333,759 B1 | 12/2001 | Mazzilli | |
| 7,697,028 B1 | 4/2010 | Johnson | |
| D743,468 S | 11/2015 | Ribeiro | |
| 9,262,800 B2 | 2/2016 | Cilia | |
| 2002/0089427 A1* | 7/2002 | Aratani | G05B 19/0426 340/12.26 |
| 2002/0121969 A1* | 9/2002 | Joao | B60R 25/018 340/425.5 |
| 2005/0070320 A1* | 3/2005 | Dent | H04W 72/005 455/516 |
| 2005/0174229 A1* | 8/2005 | Feldkamp | G08B 13/19656 340/506 |
| 2007/0097212 A1 | 5/2007 | Farneman | |
| 2009/0273673 A1 | 11/2009 | Worley, III | |
| 2014/0139330 A1* | 5/2014 | Kleinstuck | B60R 25/102 340/426.19 |
| 2014/0347440 A1 | 11/2014 | Hatcher | |

FOREIGN PATENT DOCUMENTS

WO 2006121482 A2 11/2006

\* cited by examiner

*Primary Examiner* — Nabil H Syed
*Assistant Examiner* — Cal J Eustaquio

(57) ABSTRACT

The vehicle safety and security system comprises one or more vehicle cameras which feed imaging data to a control box located within the vehicle and which may be controlled by a remote control device. The vehicle cameras may be located at positions within or outside of the vehicle. Imaging data captured by the cameras may be recorded or transmitted to a remote location, including transmission to the remote control device. The remote control device may display imaging data obtained from the control box and may change operational parameters such as the orientation of the cameras and whether imaging data should be recorded or not. The cameras may inform the remote control device of intrusions into the field of view of the cameras and the remote control device may cause the control box to preserve imaging data recorded in temporal proximity to incidents at the vehicle.

6 Claims, 4 Drawing Sheets

VEHICLE SAFETY AND SECURITY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of security, more specifically, a vehicle safety and security system.

SUMMARY OF INVENTION

The vehicle safety and security system comprises one or more vehicle cameras which feed imaging data to a control box located within the vehicle and which may be controlled by a remote control device. The vehicle cameras may be located at positions within or outside of the vehicle. Imaging data captured by the cameras may be recorded or transmitted to a remote location, including transmission to the remote control device. The remote control device may display imaging data obtained from the control box and may change operational parameters such as the orientation of the cameras and whether imaging data should be recorded or not. The cameras may inform the remote control device of intrusions into the field of view of the cameras and the remote control device may cause the control box to preserve imaging data recorded in temporal proximity to incidents at the vehicle.

An object of the invention is to provide multiple cameras to monitor interior and exterior areas of a vehicle.

Another object of the invention is to record video imaging data when incidents occur in the field of vision of a vehicle camera.

A further object of the invention is to provide a remote control device that is capable of view imaging data sourced by the vehicle camera and of controlling operational parameters of the cameras.

Yet another object of the invention is to enable a vehicle security remote monitoring service.

These together with additional objects, features and advantages of the vehicle safety and security system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle safety and security system in detail, it is to be understood that the vehicle safety and security system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle safety and security system.

It is therefore important that the claims be regarded as including such equivalent construction insofar as they do not depart from the spirit and scope of the vehicle safety and security system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
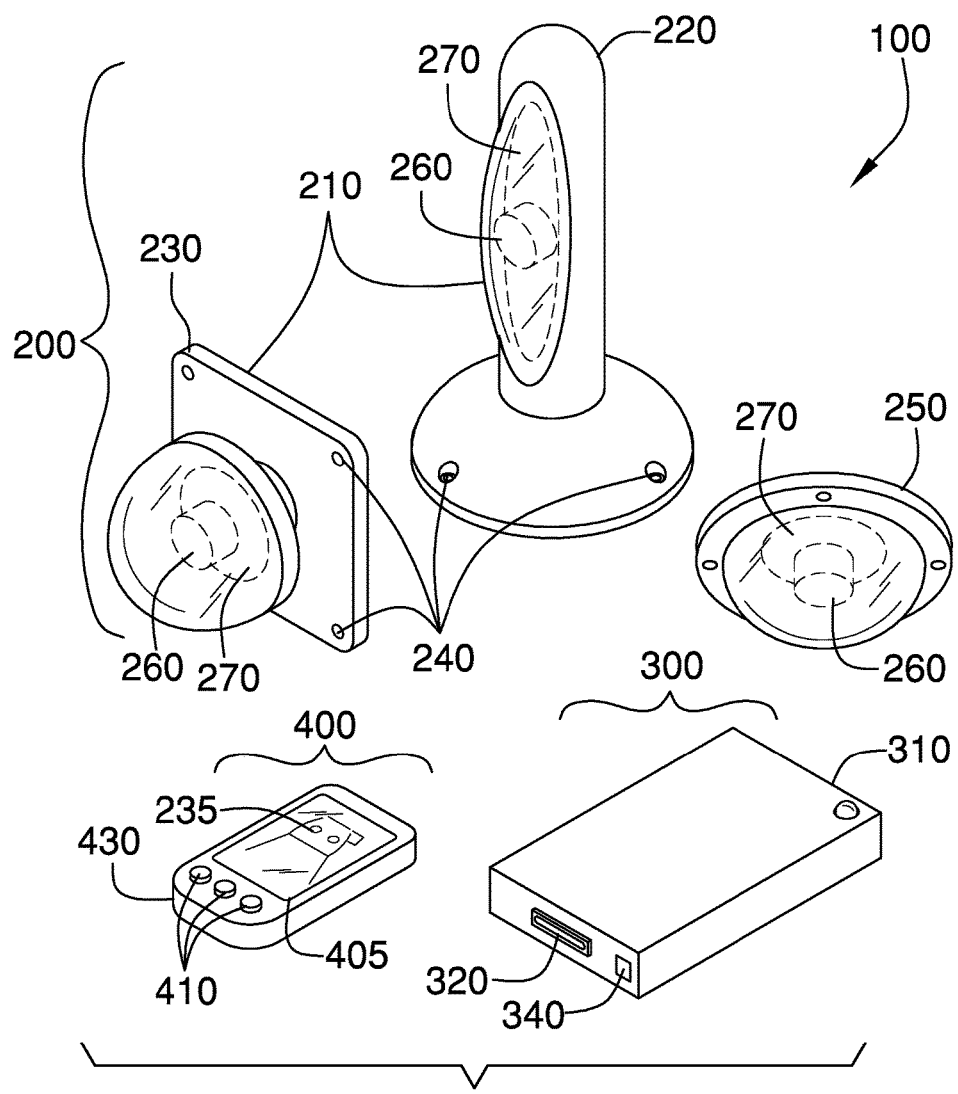
FIG. 1 is a perspective view of an embodiment of the disclosure.
Figure 2:
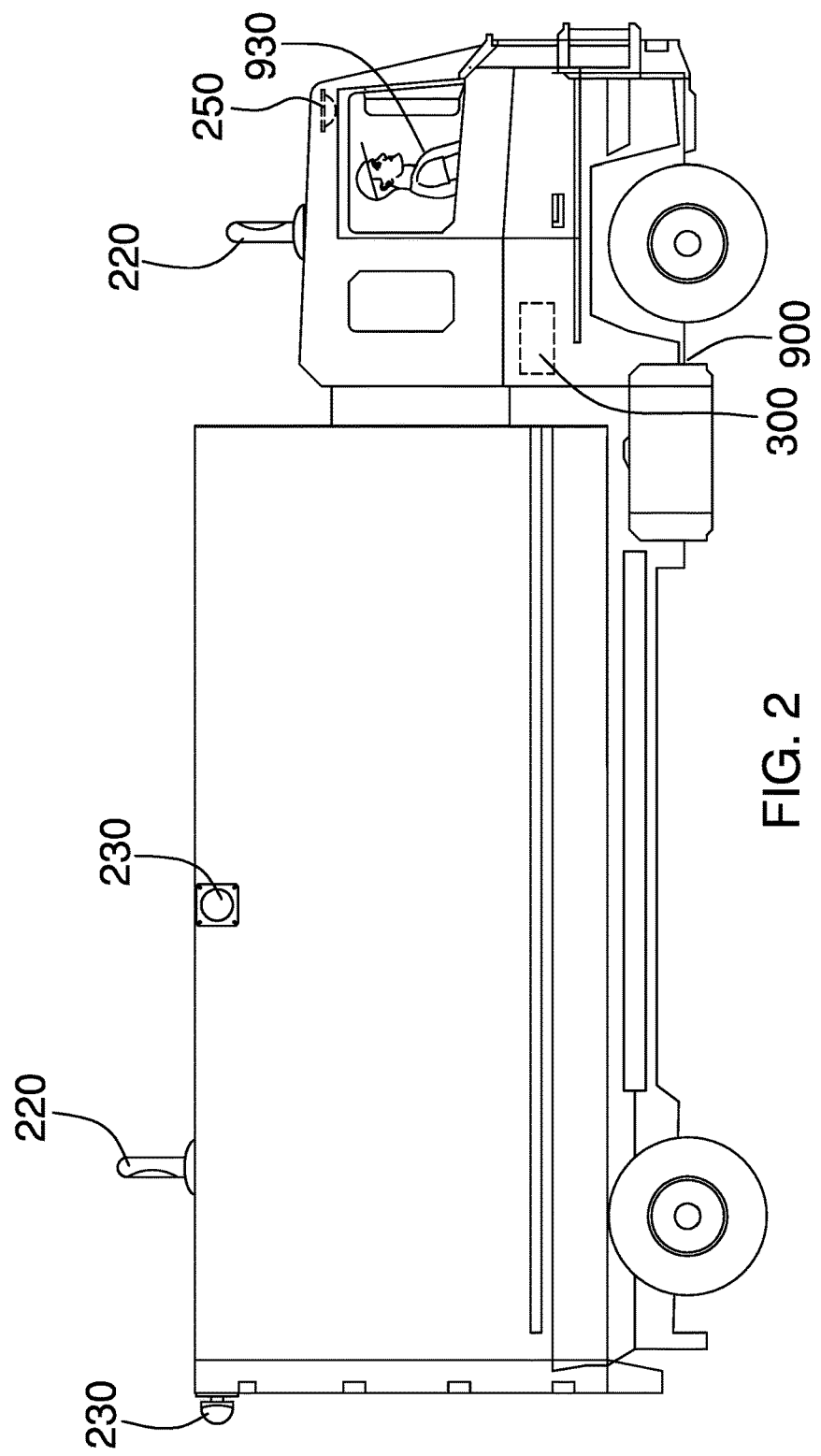
FIG. 2 is a view of an embodiment of the disclosure in use on a truck.
Figure 3:
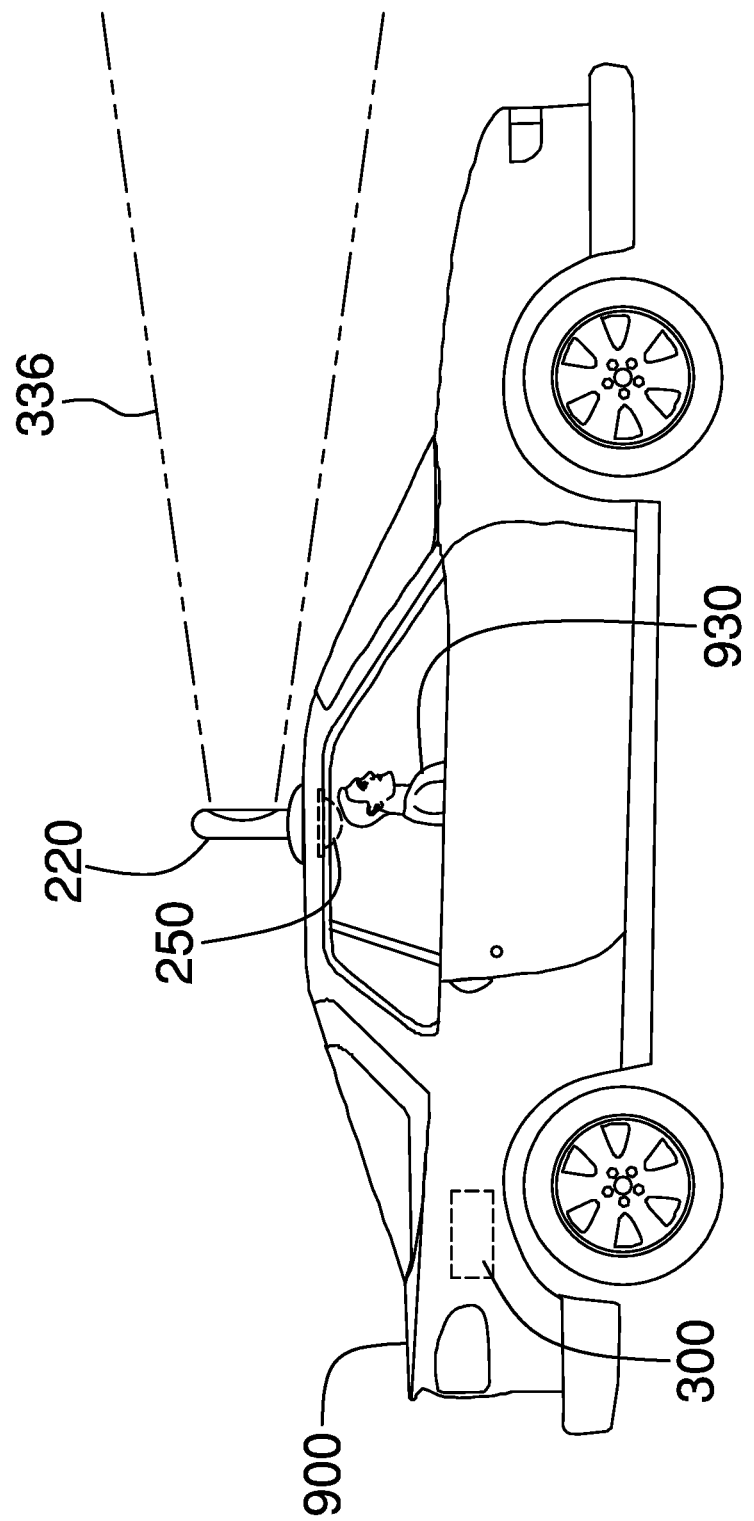
FIG. 3 is a view of an embodiment of the disclosure in use on an automobile.
Figure 4:
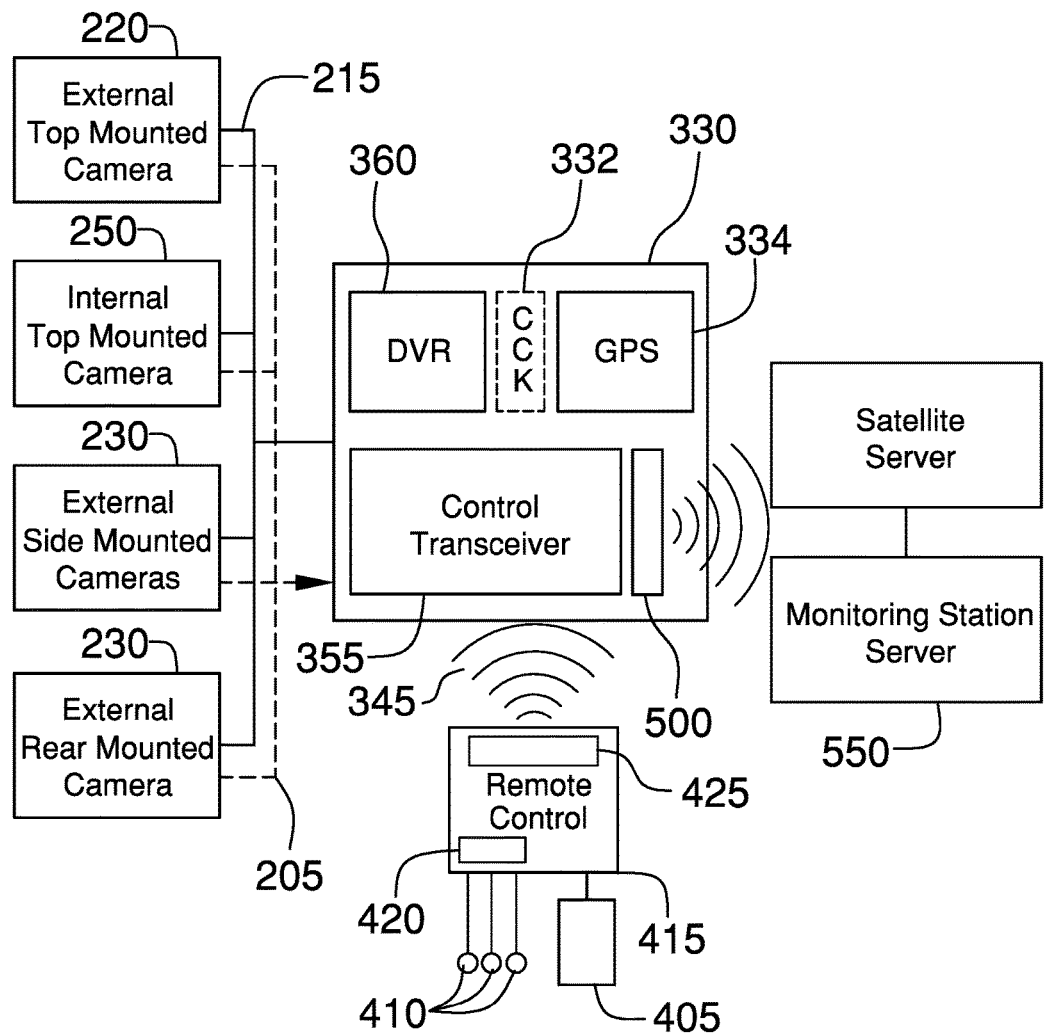
FIG. 4 is a block diagram of an embodiment of the disclosure.

Detailed reference will now be made to a first potential embodiment of the disclosure, which is illustrated in FIGS. 1 through 4.

The vehicle safety and security system 100 comprises one or more vehicle cameras 200, a control box 300, and a remote control device 400 The vehicle safety and security system 100 enables a vehicle owner 930 to monitor activities in and around a vehicle 900 from a remote location. The control box 300 may record at least one imaging channel 215 obtained from the one or more vehicle cameras 200 and may trigger security alerts based upon the content of the at least one imaging channel 215.

The one or more vehicle cameras 200 may be mounted to the vehicle 900 and provide imaging data 235 to the control box 300 via the at least one imaging channel 215. The one or more vehicle cameras 200 may comprise one or more external vehicle cameras 210. The one or more vehicle cameras 200 may comprise one or more internal vehicle cameras 250.

In some embodiments, the one or more vehicle cameras 200 may comprise optical elements that are sensitive in the infrared (IR) portion of the spectrum, enabling the one or more vehicle cameras 200 to have at least some capability to discern images in low light levels. As a non-limiting example, the ability to discern images in low light condition may be known as "night vision". In some embodiments, the one or more vehicle cameras 200 may comprise one or more IR LEDs (not illustrated in the figures) to provide additional illumination for low-light conditions.

The one or more vehicle cameras 200 may provide an alert signal 205 to the control box 300 when motion is detected in front of the one or more vehicle cameras 200. Motion in front of the one or more vehicle cameras 200 may be detected by the one or more vehicle cameras 200 comparing a previously captured image to a current image and noting a change in the image.

The at least one imaging channel 215 delivers the imaging data 235 from the one or more vehicle cameras 200 to the control box 300. In some embodiments, the at least one imaging channel 215 may be a wired connection from the one or more vehicle cameras 200 to the control box 300. In some embodiments, the at least one imaging channel 215 may be a wireless connection from the one or more vehicle cameras 200 to the control box 300. As a non-limiting example, the at least one imaging channel 215 may be a limited distance radio frequency (RF) link such as Bluetooth®.

The one or more external vehicle cameras 210 are intended to be mounted on the outside of the vehicle 900. The one or more external vehicle cameras 210 may comprise weather-resistant housings, transparent weatherproof lenses covering the optical components, and mounting provisions suitable for external mounting. As a non-limiting example, the one or more external vehicle cameras 210 may provide screw holes for mounting to the body of the vehicle 900.

The one or more external vehicle cameras 210 may comprise features and mounting options specific to locations on the vehicle 900 where they will be mounted. As non-limiting examples, the one or more external vehicle cameras 210 may comprise a top mount camera 220 and a side mount camera 230.

The top mount camera 220 is intended to be mounted outside of the vehicle 900 on a substantially horizontal surface. Substantially horizontal is defined to be any surface with an inclination from horizontal of between 0 and 45 degrees. Non-limiting examples of substantially horizontal surfaces may include the top surface of a semi-trailer or the roof of an automobile. The top mount camera 220 may comprise a positioning mechanism 270 to point camera optics 260 in different directions. As non-limiting examples, the top mount camera 220 may comprise the positioning mechanism 270 to rotate the camera optics 260 within a substantially horizontal plane, the positioning mechanism 270 to tilt the camera optics 260 up and down to change the viewing angle, the positioning mechanism 270 to raise and lower the camera optics 260 to adjust the height of the camera optics 260 over the body of the vehicle 900, or a combination of the above. The top mount camera 220 may provide a set of mounting holes 240 to aid in mounting the top mount camera 220 to the vehicle 900. In some embodiments, the top mount camera 220 may comprise a mounting magnet (not illustrated in the figures) to allow mounting of the top mount camera 220 without drilling holes in the vehicle 900.

The side mount camera 230 is intended to be mounted outside of the vehicle 900 on a substantially vertical surface. Substantially vertical is defined to be any surface with an inclination from horizontal of between 45 and 90 degrees. Non-limiting examples of substantially vertical surfaces may include the side panels and rear doors of a semi-trailer. The side mount camera 230 may comprise the positioning mechanism 270 to point the camera optics 260 in different directions. As non-limiting examples, the side mount camera 230 may comprise the positioning mechanism 270 to pivot the camera optics 260 side-to-side within a substantially horizontal plane, the positioning mechanism 270 to tilt the camera optics 260 components up and down to change the viewing angle, or a combination of the above. The side mount camera 230 may provide the set of mounting holes 240 to aid in mounting the side mount camera 230 to the vehicle 900. In some embodiments, the side mount camera 230 may comprise the mounting magnet (not illustrated in the figures) to allow mounting of the side mount camera 230 without drilling holes in the vehicle 900.

The one or more internal vehicle cameras 250 are intended to be mounted within a passenger compartment 255 of the vehicle 900. The one or more internal vehicle cameras 250 may comprise mounting hardware specific to the location within the vehicle 900 where the one or more internal vehicle cameras 250 will be mounted. As a non-limiting example, the one or more internal vehicle cameras 250 may comprise mounting holes, clips, magnets and other mounting features appropriate for mounting the one or more internal vehicle cameras 250 adjacent to the roof, on a pillar, under a dashboard, or at other locations within the vehicle 900.

The control box 300 comprises a housing 310, one or more camera connection ports 320, control electronics 330 and a power connection 340. The control box 300 may be a focal point within the vehicle 900 for receiving the imaging data 235 from the one or more vehicle cameras 200 and then processing and/or storing the imaging data 235. In some embodiments, the control box 300 might be detachable and therefore removable from the vehicle 900.

The one or more camera connection ports 320 may be individual connections for each of the one or more vehicle cameras 200 or may be one or more connections for a cable harness (not illustrated in the figures), where the cable harness is wired to more than one of the one or more vehicle cameras 200. In some embodiments, the power connection 340 might also be a part of the cable harness.

The control electronics 330 may comprise recording circuitry to record the at least one imaging channel 215 provided by the one or more vehicle cameras 200. As a non-limiting example, the recording circuitry may comprise components configured to function as a digital video recorder (DVR) 360. The at least one imaging channel 215 may be recorded so that in the event of an incident where it may be beneficial to review a video playback of the incident the control box 300 may be able to provide one or more viewing angles of the incident, as seen from the one or more vehicle cameras 200 and recorded by the control electronics 330. In some embodiments, recordings made by the control electronics 330 may be retained for a limit time period and may then be recorded over. As a non-limiting example, the amount of time that recordings are retained may be determined by the amount of memory contained within the control electronics 330. In some embodiments, once the control electronics 330 has been made aware of the incident, the memory used to store recordings in temporal proximity to the incident may be preserved by being marked as 'reserved' and not recorded over. Temporal proximity may mean a pre-determined time period beginning in advance of the incident and ending after the incident. As a non-limiting example, the specific timings associated with temporal proximity may be factory-preset and may be adjustable by the vehicle owner 930 using the remote control device 400. The vehicle owner 930 may be able to use the remote control device 400 to set the amount of time in advance of incident notification and the amount of time after incident notification that the control electronics 330 will preserve.

The control electronics 330 may be made aware of the incident through direct interaction with the vehicle owner 930 and/or by detecting events within a field of view 336 of the one or more vehicle cameras 200. As a non-limiting example, the vehicle owner 930 may activate user controls 410 on the remote control device 400 to indicate that the incident has just occurred. As a further non-limiting example, the control electronics 330 may determine that the incident has occurred because an object has moved into a zone in the field of view 336 of the one or more vehicle cameras 200.

The control electronics 330 may comprise a control transceiver 355 to provide a wireless control connection 345 between the control electronics 330 and the remote control device 400. As a non-limiting example, the wireless control connection 345 may comprise a cellular phone connection. The wireless control connection 345 may allow the control electronics 330 and the remote control device 400 to exchange information packets that determine the specifics of how the control electronics 330 will operate and what status will be presented to the vehicle owner 930 via the remote control device 400.

The control electronics 330 may comprise circuitry to select one of the one or more vehicle cameras 200. The control electronics 330 may allow for the imaging data 235 from the selected one of the one or more vehicle cameras 200 may be transmitted to a remote location.

The control electronics 330 may transmit status alerts (not illustrated in the figures) to a remote location. As a non-limiting example, one of the status alerts transmitted by the control electronics 330 may indicate that an object has moved into a zone in the field of view 336 of the one or more vehicle cameras 200.

The control electronics 330 may comprise a clock circuit 332. The control electronics 330 may comprise a global positioning system (GPS) receiver 334. The control electronics 330 may combine date and time metadata obtained from the clock circuit 332 and/or location metadata obtained from the global positioning system (GPS) receiver 334 with the imaging data 235 that is recorded or transmitted by the control box 300.

The remote control device 400 may allow the vehicle owner 930 to interact with the control electronics 330 located in the vehicle 900. The remote control device 400 comprises a display screen 405, the user controls 410, and remote control circuitry 415 packaged in a remote control housing 430 that may be carried away from the vehicle 900 by the vehicle owner 930. The remote control circuitry 415 may comprise a remote control transceiver 425 to provide the wireless control connection 345 between the control electronics 330 and the remote control device 400. The remote control circuitry 415 controls the operation of the display screen 405, the user controls 410, and the remote control transceiver 425. The remote control device 400 may be powered by a remote control battery 420.

As a non-limiting example, the control electronics 330 may transmit the imaging data 235 from a selected one of the one or more vehicle cameras 200 to the remote control device 400 where the remote control circuitry 415 may present the imaging data 235 on the display screen 405, thus allowing the vehicle owner 930 to view a specific area of the vehicle 900. As an additional non-limiting example, responsive to activation of the user controls 410 on the remote control device 400 by the vehicle owner 930, the remote control circuitry 415 may send activation information to the control box 300 via the wireless control connection 345 thus allowing the vehicle owner 930 to indicate to the control electronics 330 that the incident has occurred and that the imaging data 235 recorded from the one or more vehicle cameras 200 should be preserved. The user controls 410 may allow the vehicle owner 930 to indicate, based upon which specific one of the user controls 410 is activated, a degree of importance of the incident or an amount of time by which the preserved recording interval should be extended.

Some of the user controls 410 may allow the vehicle owner 930 to select a specific one of the one or more vehicle cameras 200 for viewing on the display screen 405, to point the one or more vehicle cameras 200 in a specific direction, to force a beginning and/or ending to recording, or to turn the system on or off.

In some embodiments, the remote control device 400 may comprise one or more indicator lights (not illustrated in the figures) which become illuminated responsive to receiving the status alerts (not illustrated in the figures) from the control electronics 330. Once illuminated, the one or more indicator lights (not illustrated in the figures) may be turned off via the vehicle owner 930 interacting with the remote control device 400.

In some embodiments, the remote control device 400 may take the form of an application running on smartphone or Personal Computer (not illustrated in the figures).

In some embodiments, the control box 300 may be in communication with a remote security monitoring service 550 which receives the status alerts (not illustrated in the figures) initiated by the control electronics 330. The remote security monitoring service 550 may also assume control of the control electronics 330 for the purpose of viewing the imaging data 235 obtained from the one or more vehicle cameras 200 and to change settings within the control electronics 330. In some embodiments, the communication link between the control box 300 and the remote security monitoring service 550 may be the wireless control connection 345. In some embodiments, the control box 300 may comprise a satellite interface 500 to provide an alternative control connection between the control box 300 and the remote security monitoring service 550.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle safety and security system comprising:
one or more vehicle cameras, a control box, and a remote control device;
wherein the vehicle safety and security system is adapted to enable a vehicle owner to monitor activities in and around a vehicle from a remote location;
wherein the control box records at least one imaging channel obtained from the one or more vehicle cameras;
wherein the control box triggers security alerts based upon the content of the at least one imaging channel;
wherein the one or more vehicle cameras are mounted to the vehicle and provide imaging data to the control box via the at least one imaging channel;
wherein the one or more vehicle cameras comprise one or more external vehicle cameras;
wherein the one or more vehicle cameras comprise one or more internal vehicle cameras;
wherein the at least one imaging channel delivers the imaging data from the one or more vehicle cameras to the control box;
wherein the one or more vehicle cameras provide an alert signal to the control box when motion is detected in front of the one or more vehicle cameras;
wherein the one or more external vehicle cameras comprises weather-resistant housings, transparent weatherproof lenses covering the optical components, and mounting provisions suitable for external mounting;
wherein the one or more external vehicle cameras comprises a top mount camera and a side mount camera;
wherein the top mount camera is intended to be mounted outside of the vehicle on a substantially horizontal surface;
wherein the top mount camera comprises a positioning mechanism to rotate camera optics within a substantially horizontal plane;
wherein the top mount camera comprises the positioning mechanism to tilt the camera optics up and down to change the viewing angle;
wherein the top mount camera comprises the positioning mechanism to raise and lower the camera optics to adjust the height of the camera optics over the body of the vehicle;
wherein the side mount camera is intended to be mounted outside of the vehicle on a substantially vertical surface;
wherein the side mount camera comprises the positioning mechanism to pivot the camera optics side-to-side within a substantially horizontal plane;
wherein the positioning mechanism to tilt the camera optics components up and down to change the viewing angle;
wherein the top mount camera comprises a mounting magnet to allow mounting of the top mount camera without drilling holes in the vehicle;
wherein the side mount camera comprises the mounting magnet to allow mounting of the side mount camera without drilling holes in the vehicle;
wherein the one or more internal vehicle cameras mount within a passenger compartment of the vehicle;
wherein the control box comprises a housing, one or more camera connection ports, control electronics and a power connection;
wherein the control box is a focal point within the vehicle for receiving the imaging data from the one or more vehicle cameras and then processing and/or storing the imaging data;
wherein the control box is detachable and therefore removable from the vehicle;
wherein the control electronics comprises recording circuitry to record the at least one imaging channel provided by the one or more vehicle cameras;
wherein the recording circuitry comprises components configured to function as a digital video recorder;
wherein once the control electronics has been made aware of the incident, the memory used to store recordings in temporal proximity to the incident is preserved by being marked as 'reserved' and not recorded over;
wherein the control electronics is adapted to be made aware of the incident through direct interaction with the vehicle owner or by detecting events within a field of view of the one or more vehicle cameras;
wherein the control electronics comprises a control transceiver to provide a wireless control connection between the control electronics and the remote control device;
wherein the control electronics comprises circuitry to select one of the one or more vehicle cameras;
wherein the control electronics transmit status alerts to a remote location;
wherein the control electronics comprises a clock circuit and a global positioning system (GPS) receiver;
wherein the control electronics combines date and time metadata obtained from the clock circuit and location metadata obtained from the global positioning system (GPS) receiver with the imaging data that is recorded or transmitted by the control box;
wherein the control box is in communication with a remote security monitoring service which receives the status alerts initiated by the control electronics;
wherein the remote security monitoring service assumes control of the control electronics for the purpose of viewing the imaging data obtained from the one or more vehicle cameras and to change settings within the control electronics.

2. The vehicle safety and security system according to claim 1
wherein the at least one imaging channel is a wired connection from the one or more vehicle cameras to the control box.

3. The vehicle safety and security system according to claim 1
wherein the at least one imaging channel is a wireless connection from the one or more vehicle cameras to the control box.

4. The vehicle safety and security system according to claim 1
wherein the remote control device is adapted to allow the vehicle owner to interact with the control electronics located in the vehicle;
wherein the remote control device comprises a display screen, the user controls, and remote control circuitry;
wherein the remote control device is packaged in a remote control housing that is adapted to be carried away from the vehicle by the vehicle owner;
wherein the remote control circuitry comprises a remote control transceiver to provide the wireless control connection between the control electronics and the remote control device;

wherein the remote control circuitry controls the operation of the display screen, the user controls, and the remote control transceiver.

5. The vehicle safety and security system according to claim 4 wherein the remote control device takes the form of an application running on smartphone or Personal Computer.

6. The vehicle safety and security system according to claim 4 wherein the control box comprises a satellite interface to provide an alternative control connection between the control box and the remote security monitoring service.

\* \* \* \* \*